June 30, 1925. 1,543,898
A. J. BARRON
AUTOMOTIVE VEHICLE CROSS SPRING SEAT
Filed Feb. 17, 1923
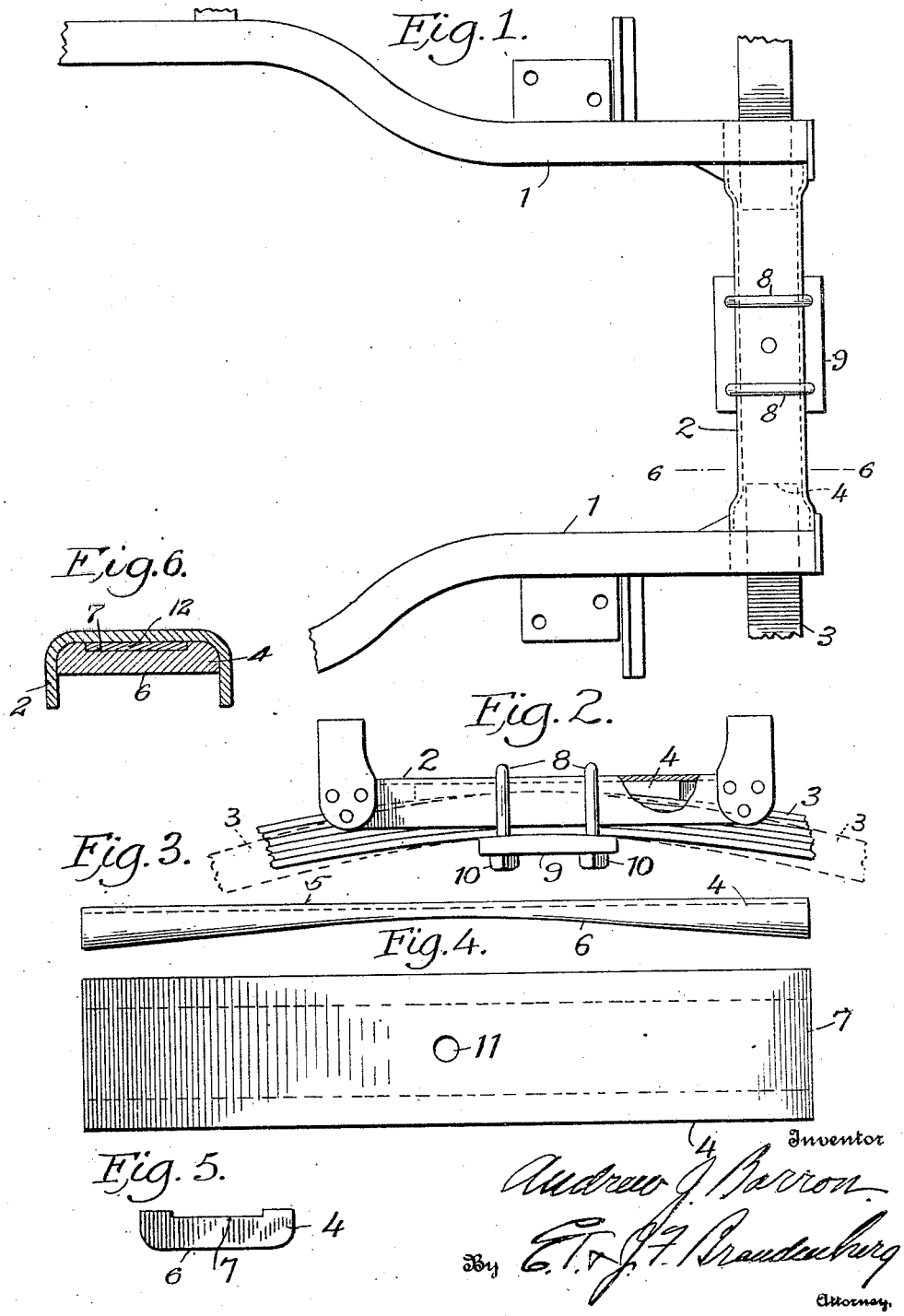

Patented June 30, 1925.

1,543,898

UNITED STATES PATENT OFFICE.

ANDREW J. BARRON, OF CINCINNATI, OHIO, ASSIGNOR, BY MESNE ASSIGNMENTS, TO PHOENIX HORSE SHOE COMPANY, OF NEW YORK, N. Y., A CORPORATION OF ILLINOIS.

AUTOMOTIVE-VEHICLE CROSS-SPRING SEAT.

Application filed February 17, 1923. Serial No. 619,622.

*To all whom it may concern:*

Be it known that I, ANDREW J. BARRON, residing in Cincinnati, in the county of Hamilton, in the State of Ohio, and a citizen of the United States, have invented certain new and useful Improvements in Automotive-Vehicle Cross-Spring Seats, of which the following is a specification.

In platform-spring equipment adapted more particularly for use in connection with Ford pleasure automotive vehicles, where the springs are made very light in order to obtain easy riding, there is a tendency to body sway of the vehicle.

The object of my invention is, while retaining the same resiliency of the springs, to correct the tendency of the vehicle to body sway, by the provision of a simple and efficient device, in the nature of a seat, of novel construction, for the cross spring.

The invention, therefore, resides in a seat for the cross spring provided with a flat plane face adapted to abut squarely against the inner surface of the member supporting the cross spring, and with an oppositely disposed, longitudinally curved or arcuate face. In use, the cross spring normally contacts with a portion of the area of said arcuate face, intermediate the ends thereof, but, when the spring is under load, or when the vehicle passes over rough ground or swings around corners, the spring flexes and the entire area of said arcuate face of the seat comes into play, thus tending to prevent body sway.

The invention also resides in the combination, with a semi-elliptic cross spring, of a seat therefor having an arcuate face, the arc of which is different from that of the cross spring.

It is obvious that the semi-elliptic cross spring and the seat therefor may be handled and sold as a unit.

The accompanying drawing discloses the preferred form of embodiment of my invention, and like reference-characters indicate corresponding parts throughout the several views, which may be briefly described as follows:

Figure 1 is a top plan view of part of the chassis of an automotive vehicle, showing, more particularly, the two longitudinal frame-bars, the rear cross-bar, and the rear cross-spring supported by or secured to the latter;

Figure 2 is a view in side elevation of the supporting-member for the cross-spring, with the cross-spring in assembled position, and my spring-seat between said supporting-member and said spring;

Figure 3 is a detached detail view, in side elevation of the spring-seat;

Figure 4 is a bottom plan view of the spring-seat;

Figure 5 is an end view of the spring-seat.

Figure 6 is a cross sectional view, on the plane of the section line 6—6, Fig. 1, the spring 3 being omitted.

Referring, now, in detail to the drawing: 1, 1 designate the two longitudinal frame-bars of the chassis of the automotive vehicle, and 2 the rear cross member for supporting the semi-elliptic cross-spring 3. In the form shown in the drawing, the cross-member 2 is a channel-bar, desirably of pressed steel.

Between the inner surface of the channel-bar and the spring 3 is interposed my spring-seat 4, which is an elongated member having one flat-plane, longitudinally-extending surface or face 5 adapted to bear against the inner surface of the cross-member 2, and an oppositely-disposed, longitudinally-curved or arcuate face 6 adapted to contact with the spring 3, the spring-seat being thus of progressively decreasing width from the two ends thereof to the center, as seen in Fig. 3. It should be understood that the spring 3 is of an arc different from the arc of the curved face 6; that is to say, the face 6 of the spring-seat 4 is struck from the arc of a circle of greater diameter than that of the circle of which the elliptic spring is an arc; so that, when the parts are in assembled position, as shown in Fig. 2, the spring 3 normally touches only a portion of the length of the spring-seat 4, intermediate the ends thereof; but, when flexed, as when the spring is under load, or when the automotive vehicle is traveling over rough roads, or swinging around a curve, the spring bears against the entire length of the curved face 6 of the seat 4, which thus functions to resist body-sway of the vehicle. The normal position of the spring is shown in full lines in Fig. 2, and, in flexed position, in dotted lines.

When the parts are assembled, the flat surface or face of the seat bears against the inner surface of the channel-bar 2, as shown in Fig. 2, and U-bolts pass around said channel-bar and the portion of the spring 3 disposed between the flanges of the channel-bar, and through a plate 9, as usual, and nuts 10, 10 are screwed on the threaded terminals of said U-bolts to retain the parts in assembled relation.

The spring-seat 4 is provided with a central aperture 11, in which fits the head of the center-bolt which secures the leaves of the spring 3 together. The spring-seat 4 is also preferably provided on its flat-plane surface or face with a longitudinally-extending groove 7 for the reception of a pad or cushion 12, which insures a perfectly level bearing of the seat-member 4 against the cross-member 2.

Having thus fully described my invention, what I claim as new and desire to secure by Letters-Patent is:

The combination with the rear cross channel of an automobile frame, of an elliptical spring seated in said channel; a bar disposed between said spring and said channel and provided with a longitudinally-curved face the arc of which is of greater radius than that of the spring and, oppositely thereto, with a flat-plane face adapted to bear against the channel and having a longitudinally-extending pocket; a pad disposed in said pocket, insuring a perfectly level bearing of the bar against the channel; and means for securing said spring and bar in assembled relation with said channel.

In testimony whereof, I hereunto affix my signature.

ANDREW J. BARRON.